(12) United States Patent
Ganapathy et al.

(10) Patent No.: US 9,706,389 B2
(45) Date of Patent: Jul. 11, 2017

(54) COMMUNICATION SYSTEM

(71) Applicant: NEC Corporation, Tokyo (JP)

(72) Inventors: Suresh Ganapathy, Tokyo (JP);
Jagdeep Singh Ahluwalia, Tokyo (JP);
Neeraj Gupta, Tokyo (JP); Kenji Kawaguchi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/066,971

(22) Filed: Mar. 10, 2016

(65) Prior Publication Data

US 2016/0192174 A1 Jun. 30, 2016

Related U.S. Application Data

(63) Continuation of application No. 14/358,023, filed as application No. PCT/JP2012/080250 on Nov. 15, 2012, now Pat. No. 9,326,123.

(30) Foreign Application Priority Data

Dec. 1, 2011 (GB) .................... 1120717.2

(51) Int. Cl.
*H04W 4/00* (2009.01)
*H04W 8/00* (2009.01)
*H04W 24/00* (2009.01)
*H04W 84/04* (2009.01)

(52) U.S. Cl.
CPC ........... *H04W 8/005* (2013.01); *H04W 24/00* (2013.01); *H04W 84/045* (2013.01)

(58) Field of Classification Search
CPC .... H04W 8/005; H04W 24/00; H04W 84/045

USPC .......... 455/436–444, 435.1–435.3, 453, 434
See application file for complete search history.

(56) References Cited

U.S. PATENT DOCUMENTS

| 8,634,836 | B2* | 1/2014 | Pani ..................... H04W 24/10 370/331 |
|---|---|---|---|
| 8,687,588 | B2 | 4/2014 | Subrahmanya |
| 2004/0208126 | A1 | 10/2004 | Wassew et al. |
| 2008/0201109 | A1 | 8/2008 | Zill et al. |
| 2009/0017864 | A1 | 1/2009 | Keevill et al. |
| 2009/0190550 | A1 | 7/2009 | Giustina et al. |
| 2009/0316585 | A1 | 12/2009 | Srinivasan et al. |
| 2010/0002614 | A1 | 1/2010 | Subrahmanya |
| 2010/0029274 | A1 | 2/2010 | Deshpande et al. |

(Continued)

FOREIGN PATENT DOCUMENTS

| EP | 2 048 899 A1 | 4/2009 |
|---|---|---|
| EP | 2 262 135 A2 | 12/2010 |

(Continued)

OTHER PUBLICATIONS

U.S. Notice of Allowance dated Dec. 18, 2015 in co-pending U.S. Appl. No. 14/358,023.

(Continued)

*Primary Examiner* — Wayne Cai
(74) *Attorney, Agent, or Firm* — Sughrue Mion, PLLC (57) ABSTRACT

A base station of a communications network includes a transceiver circuit configured to transmit signals in a first Radio Access Node (RAN) and signals in a second RAN, and a controller configured to determine if signals in the second RAN should be stopped based on a load of the first RAN.

8 Claims, 5 Drawing Sheets

(56) References Cited

U.S. PATENT DOCUMENTS

| | | | |
|---|---|---|---|
| 2010/0234042 A1* | 9/2010 | Chan | H04W 36/0061 |
| | | | 455/453 |
| 2010/0240314 A1 | 9/2010 | Chang et al. | |
| 2011/0019582 A1 | 1/2011 | Okmyanskiy et al. | |
| 2011/0199923 A1 | 8/2011 | Persson et al. | |
| 2013/0035138 A1 | 2/2013 | Abbott | |
| 2013/0079020 A1 | 3/2013 | Shahid et al. | |

FOREIGN PATENT DOCUMENTS

| | | |
|---|---|---|
| JP | 2009-504047 A | 1/2009 |
| JP | 2011-527163 A | 10/2011 |

OTHER PUBLICATIONS

US *Ex Parte Quayle* Action dated Sep. 2, 2015 in co-pending U.S. Appl. No. 14/358,023.

International Search Report in PCT/JP2012/080250 dated Mar. 13, 2013 (English Translation Thereof).

Japanese Office Action dated Jun. 24, 2015 with a partial English translation.

\* cited by examiner

COMMUNICATION SYSTEM

The present application is a Continuation Application of U.S. patent application Ser. No. 14/358,023, filed on May 13, 2014, which is based on International Application No. PCT/JP2012/080250, filed on Nov. 15, 2012, which is based on the United Kingdom Patent Application No. 1120717.2, filed on Dec. 1, 2011, the entire contents of which are incorporated herein by reference.

TECHNICAL FIELD

The present invention relates to mobile telecommunication networks and to parts thereof, particularly but not exclusively networks operating according to the 3rd Generation Partnership Project (3GPP) standards or equivalents or derivatives thereof. The invention has particular although not exclusive relevance to the application of a network monitor mode (NMM) by a femto access point (FAP).

BACKGROUND ART

Under the 3GPP standards, a NodeB (or an eNB in LTE) is a base station via which mobile devices connect to the core network. The 3GPP standards body has also adopted an official architecture and started work on a new standard for home base stations to provide short range 3G radiofrequency (RF) coverage. Where the home base station is operating to provide a UMTS (Universal Mobile Telecommunications System) Terrestrial Radio Access Network (UTRAN) type cell, the home base station is sometimes referred to as an HNB. Where the home base station is operating in accordance with the (Long Term Evolution) LTE standards to provide an LTE or evolved UTRAN (E-UTRAN) cell, the home base station is sometimes referred to as an HeNB. Where the home base station is operating to provide a UMTS (Universal Mobile Telecommunications System) Terrestrial Radio Access Network (UTRAN) type cell, the home base station is sometimes referred to simply as an HNB. A similar architecture will also be applied in the WiMAX network. In this case, the home base station is commonly referred to as a femto cell. For simplicity, the present application will use the term HeNB to refer to any LTE home base station, the term HNB to refer to UMTS/UTRAN home base stations, and the term home base station generically to refer to HNB, HeNBs or other such base stations. Each home base station will provide radio coverage (for example, 3G/4G/WiMAX) within the home, small and medium enterprise, shopping Malls etc and will sometimes connect to the core network via a suitable residential gateway and public or corporate broadband access network (for example via an ADSL link to the Internet).

The functionality of a home base station is often provided by a so called 'femto access point' (FAPs) and the term 'home base station' and 'femto access point' are often used interchangeably. An FAP can comprise a single mode FAP which provides the functionality of a single home base station operating a cell of a particular radio access technology (e.g. UTRAN or E-UTRAN). An FAP can also comprise a dual mode (or possibly multimode) FAP which provides the functionality of two (or possibly more) home base stations each effectively operating a cell of a different radio access technology (e.g. a UTRAN cell and an E-UTRAN cell).

In order to provide for mobility from one cell of the communications network to another, each FAP has a network monitor mode (NMM) functionality that allows it to scan for neighbouring cells and to place information, such as cell IDs or the like, relating to the neighbouring cells detected during the scan into a neighbour table or database at the FAP. In order to initiate the NMM and start scanning for neighbouring cells, the FAP must first stop downlink communication in the cell(s) that it operates. However, if there are any active mobile telephones connected via the FAP, the FAP cannot terminate downlink transmissions without disrupting the communication of the active mobile telephone(s). Accordingly, the FAP has to wait until the active mobile telephone(s) are no longer connected, before initiating the NMM, resulting in an associated, potentially undesirable, delay.

In the case of dual mode (or multimode) FAPs, which are more likely to be serving an active mobile telephone than a single mode FAP, a delay is more likely. Further, the possible number of active mobile telephones being served by a dual mode (or multimode) FAP when the NMM is to be initiated is likely to be higher than for a single mode FAP. This can lead to inefficiencies in the NMM scanning process. Moreover, scanning by the plurality of home base station components of a dual (or multimode) FAP can lead to a relatively high energy consumption because the scanning via each home base station component consumes energy meaning that the cumulative energy consumption is potentially higher than for scanning via a single mode FAP.

Accordingly, there is a need for a communication system in which one or more of the above issues is overcome or at least ameliorated.

Disclosure of Invention

According to one aspect of the present invention, there is provided a communication system comprising: a communication network comprising a plurality of communication cells, a plurality of mobile communication devices each operable to connect into the communication network via at least one of said communication cells, and communication apparatus for providing at least one of said communication cells, wherein the communication apparatus comprises: means for providing a first communication cell via which a mobile communication device can connect to a communication network; means for determining whether a mobile communication device is connected to the communication network via the first communication cell; and means for monitoring for further communication cells in dependence on a result of the determination by the determining means wherein said monitoring means is operable to: when no mobile communication devices are determined to be connected via the first communication cell, monitor for further communication cells operating using any of a first set of radio access technology/frequency band combinations; and when at least one mobile communication device is determined to be connected via the first communication cell, monitor for further communication cells operating using any of a second set of radio access technology/frequency band combinations; wherein at least one of said first and second sets comprises at least one radio access technology/frequency band combination not present in the other of said first and second sets.

According to one aspect of the present invention, there is provided communication apparatus for providing at least one communication cell and for monitoring other communication cells, the communication apparatus comprising: means for providing a first communication cell via which a mobile communication device can connect to a communication network; means for determining whether a mobile communication device is connected to the communication network via the first communication cell; and means for monitoring for further communication cells in dependence on a result of the determination by the determining means wherein said monitoring means is operable to: when no mobile communication devices are determined to be connected via the first communication cell, monitor for further communication cells operating using any of a first set of radio access technology/frequency band combinations; and when at least one mobile communication device is determined to be connected via the first communication cell, monitor for further communication cells operating using any of a second set of radio access technology/frequency band combinations; wherein at least one of said first and second sets comprises at least one radio access technology/frequency band combination not present in the other of said first and second sets.

The communication apparatus may further comprise: means for providing a second communication cell via which a mobile communication device may connect to a communication network; wherein said determining means may be operable to determine whether at least one mobile communication device is connected to the communication network via the first communication cell and whether at least one mobile communication device is connected to the communication network via the second communication cell; and wherein said monitoring means may be operable to: when no mobile communication devices are determined to be connected via the first communication cell and no mobile communication devices are determined to be connected via the second communication cell, monitor for further communication cells operating using any of said first set of radio access technology/frequency band combinations; and when at least one mobile communication device is determined to be connected via the first communication cell and no mobile communication devices are determined to be connected via the second communication cell, monitor for further communication cells operating using any of said second set of radio access technology/frequency band combinations.

The means for providing a first communication cell may be operable to provide a first communication cell that operates using a first radio access technology/frequency band combination. The means for providing a second communication cell may be operable to provide a second communication cell that operates using a second radio access technology/frequency band combination.

The first set may comprise at least one radio access technology/frequency band combination not present in said second set.

The first set of radio access technology/frequency band combinations may comprise the first radio access technology/frequency band combination and the second radio access technology/frequency band combination. The second set of radio access technology/frequency band combinations may comprise the second radio access technology/frequency band combination but not the first radio access technology/frequency band combination.

The means for monitoring for further communication cells in dependence on a result of the determination may be operable to not monitor for any further communication cells when at least one mobile communication device is determined to be connected via the first communication cell and at least one mobile communication device is determined to be connected via the second communication cell.

The monitoring means may be operable to: when at least one mobile communication device is determined to be connected via the second communication cell but no mobile communication device is determined to be connected via the first communication cell, monitor for further communication cells operating using any of a third set of radio access technology/frequency band combinations, wherein at least one of said second and third sets may comprise at least one radio access technology/frequency band combinations not present in the other of said second and third sets.

The first set may comprise at least one radio access technology/frequency band combination not present in the third set. The second and third sets may each comprise at least one radio access technology/frequency band combination not present in the other of said second and third sets. The third set of radio access technology/frequency band combinations may comprise the first radio access technology/frequency band combination but not the second radio access technology/frequency band combination.

The monitoring means may be operable to, when said determining means determines that no mobile communication devices are connected via at least one of said communication cells, stop downlink communication, prior to monitoring for further communication cells, in each communication cell for which said determining means determines that no mobile communication devices are connected via that communication cell.

The monitoring means may be operable to: monitor a first subset of said first set of radio access technology/frequency band combinations using said means for providing a first communication cell; and monitor a second subset of said first set of radio access technology/frequency band combinations using said means for providing a second communication cell.

At least one of said first and second subsets of said first set of radio access technology/frequency band combinations may comprise at least one radio access technology/frequency band combination not present in the other of said first and second subsets of said first set of radio access technology/frequency band combinations.

The first and second subsets of said first set of radio access technology/frequency band combinations may each comprise at least one radio access technology/frequency band combination not present in the other of said first and second subsets of said first set of radio access technology/frequency band combinations. The first and second subsets of said first set of radio access technology/frequency band combinations may not comprise a radio access technology/frequency band combination that is present in the other of said first and second subsets of said first set of radio access technology/frequency band combinations.

The means for providing a first communication cell may comprise one of a Universal Mobile Telecommunications System (UMTS) based home base station (HNB) and a Long Term Evolution (LTE) based home base station (HeNB). The means for providing a second communication cell may comprise one of a Universal Mobile Telecommunications System (UMTS) based home base station (HNB) and a Long Term Evolution (LTE) based home base station (HeNB).

The first communication cell may operate using at least one of a Long Term Evolution (LTE) based radio access technology and a Universal Mobile Telecommunications System (UMTS) based radio access technology. The second communication cell may operate using at least one of a Long Term Evolution (LTE) based radio access technology and a Universal Mobile Telecommunications System (UMTS) based radio access technology.

The radio access technology that the first communication cell operates using may be different to the radio access technology that the second communication cell operates using. The frequency band that the first communication cell operates using may be different to the frequency band that the second communication cell operates using.

The radio access technology that the first communication cell operates using may be the same as the radio access technology that the second communication cell operates using, and the frequency band that the first communication cell operates using may be different to the frequency band that the second communication cell operates using.

According to one aspect of the present invention, there is provided a method of monitoring for communication cells performed by communication apparatus, the method comprising: providing a first communication cell via which a mobile communication device can connect to a communication network determining whether a mobile communication device is connected to the communication network via the first communication cell; and monitoring for further communication cells in dependence on a result of the determination wherein: when no mobile communication devices are determined to be connected via the first communication cell said method comprises monitoring for further communication cells operating using any of a first set of radio access technology/frequency band combinations; when at least one mobile communication device is determined to be connected via the first communication cell said method comprises monitoring for further communication cells operating using any of a second set of radio access technology/frequency band combinations; and at least one of said first and second sets comprises at least one radio access technology/frequency band combination not present in the other of said first and second sets.

According to one aspect of the present invention, there is provided communication apparatus for providing at least one communication cell and for monitoring other communication cells, the communication apparatus comprising: means for providing a first communication cell via which a mobile communication device can connect to a communication network; means for providing a second communication cell via which a mobile communication device can connect to a communication network; means for determining whether at least one mobile communication device is connected to the communication network via the first communication cell and whether at least one mobile communication device is connected to the communication network via the second communication cell; and means for monitoring for further communication cells in dependence on a result of the determination by the determining means wherein said monitoring means is operable to: when no mobile communication devices are determined to be connected via the first communication cell and no mobile communication devices are determined to be connected via the second communication cell, stop downlink transmission in the first communication cell and the second communication cell prior to monitoring for further communication cells; and when at least one mobile communication device is determined to be connected via the first communication cell and no mobile communication devices are determined to be connected via the second communication cell, stop downlink transmission in the second communication cell but not the second communication cell prior to monitoring for further communication cells.

The means for providing a first communication cell may be operable to provide a first communication cell that operates using a first radio access technology/frequency band combination. The means for providing a second communication cell may be operable to provide a second communication cell that operates using a second radio access technology/frequency band combination.

The monitoring means may be operable to: when no mobile communication devices are determined to be connected via the first communication cell and no mobile communication devices are determined to be connected via the second communication cell, monitor for further communication cells operating using any of a first set of radio access technology/frequency band combinations; and may be operable to: when at least one mobile communication device is determined to be connected via the first communication cell and no mobile communication devices are determined to be connected via the second communication cell, monitor for further communication cells operating using any of a second set of radio access technology/frequency band combinations.

The first set of radio access technology/frequency band combinations may comprise the first radio access technology/frequency band combination and the second radio access technology/frequency band combination. The second set of radio access technology/frequency band combinations may comprise the second radio access technology/frequency band combination but not the first radio access technology/frequency band combination.

According to one aspect of the present invention, there is provided a method of monitoring for communication cells performed by communication apparatus, the method comprising: providing a first communication cell via which a mobile communication device can connect to a communication network; providing a second communication cell via which a mobile communication device can connect to a communication network; determining whether at least one mobile communication device is connected to the communication network via the first communication cell and whether at least one mobile communication device is connected to the communication network via the second communication cell; and monitoring for further communication cells in dependence on a result of the determination wherein: when no mobile communication devices are determined to be connected via the first communication cell and no mobile communication devices are determined to be connected via the second communication cell, said method comprises stopping downlink transmission in the first communication cell and the second communication cell prior to monitoring for further communication cells; and when at least one mobile communication device is determined to be connected via the first communication cell and no mobile communication devices are determined to be connected via the second communication cell, said method comprises stopping downlink transmission in the second communication cell but not the second communication cell prior to monitoring for further communication cells.

According to one aspect of the present invention, there is provided communication apparatus for providing at least one communication cell and for monitoring other communication cells, the communication apparatus comprising: means for providing a first communication cell via which a mobile communication device can connect to a communication network; means for providing a second communication cell via which a mobile communication device can connect to a communication network; and means for monitoring for further communication cells operating using any of a first set of radio access technology/frequency band combinations wherein said monitoring means is operable to: monitor a first subset of said first set of radio access technology/frequency band combinations using said means for providing a first communication cell; and monitor a second subset of said first set of radio access technology/ frequency band combinations using said means for providing a second communication cell.

According to one aspect of the present invention, there is provided a method of monitoring for communication cells performed by communication apparatus, the method comprising: providing a first communication cell via which a mobile communication device can connect to a communication network; providing a second communication cell via which a mobile communication device can connect to a communication network; and monitoring for further communication cells operating using any of a first set of radio access technology/frequency band combinations wherein said monitoring comprises: monitoring a first subset of said first set of radio access technology/frequency band combinations using said means for providing a first communication cell; and monitoring a second subset of said first set of radio access technology/frequency band combinations using said means for providing a second communication cell.

According to one aspect of the present invention, there is provided communication apparatus for providing at least one communication cell and for monitoring other communication cells, the communication apparatus being operable to: provide a first communication cell via which a mobile communication device can connect to a communication network determine whether a mobile communication device is connected to the communication network via the first communication cell; and monitor for further communication cells in dependence on a result of the determination wherein: when no mobile communication devices are determined to be connected via the first communication cell said monitoring comprises monitoring for further communication cells operating using any of a first set of radio access technology/ frequency band combinations; when at least one mobile communication device is determined to be connected via the first communication cell said monitoring comprises monitoring for further communication cells operating using any of a second set of radio access technology/frequency band combinations; and at least one of said first and second sets comprises at least one radio access technology/frequency band combination not present in the other of said first and second sets.

According to one aspect of the present invention, there is provided communication apparatus for providing at least one communication cell and for monitoring other communication cells, the communication apparatus being operable to: provide a first communication cell via which a mobile communication device can connect to a communication network; provide a second communication cell via which a mobile communication device can connect to a communication network; determine whether at least one mobile communication device is connected to the communication network via the first communication cell and whether at least one mobile communication device is connected to the communication network via the second communication cell; and monitor for further communication cells in dependence on a result of the determination wherein: when no mobile communication devices are determined to be connected via the first communication cell and no mobile communication devices are determined to be connected via the second communication cell, said monitoring comprises stopping downlink transmission in the first communication cell and the second communication cell prior to monitoring for further communication cells; and when at least one mobile communication device is determined to be connected via the first communication cell and no mobile communication devices are determined to be connected via the second communication cell, said monitoring comprises stopping downlink transmission in the second communication cell but not the second communication cell prior to monitoring for further communication cells.

According to one aspect of the present invention, there is provided communication apparatus for providing at least one communication cell and for monitoring other communication cells, the communication apparatus being operable to: provide a first communication cell via which a mobile communication device can connect to a communication network; provide a second communication cell via which a mobile communication device can connect to a communication network; and monitor for further communication cells operating using any of a first set of radio access technology/ frequency band combinations wherein said monitoring comprises: monitoring a first subset of said first set of radio access technology/frequency band combinations using said means for providing a first communication cell; and monitoring a second subset of said first set of radio access technology/frequency band combinations using said means for providing a second communication cell.

According to one aspect of the present invention, there is provided communication system comprising: a communication network comprising a plurality of communication cells, a plurality of mobile communication devices each operable to connect into the communication network via at least one of said communication cells, and communication apparatus as described above.

According to one aspect of the present invention, there is provided a mobile communication device forming part of the one of the above communication systems comprising means for connecting to the communication network of the communication system via at least one of said cells.

According to one aspect of the present invention, there is provided a mobile communication device operable to connect to a communication cell provided by communication apparatus comprising: means for providing a first communication cell via which a mobile communication device can connect to a communication network; means for determining whether a mobile communication device is connected to the communication network via the first communication cell; and means for monitoring for further communication cells in dependence on a result of the determination by the determining means wherein said monitoring means is operable to: when no mobile communication devices are determined to be connected via the first communication cell, monitor for further communication cells operating using any of a first set of radio access technology/frequency band combinations; and when at least one mobile communication device is determined to be connected via the first communication cell, monitor for further communication cells operating using any of a second set of radio access technology/ frequency band combinations; wherein at least one of said first and second sets comprises at least one radio access technology/frequency band combination not present in the other of said first and second sets.

According to one aspect of the present invention, there is provided a mobile communication device operable to connect to a communication cell provided by communication apparatus comprising: means for providing a first communication cell via which a mobile communication device can connect to a communication network; means for providing a second communication cell via which a mobile communication device can connect to a communication network; means for determining whether at least one mobile communication device is connected to the communication network via the first communication cell and whether at least one mobile communication device is connected to the communication network via the second communication cell; and means for monitoring for further communication cells in dependence on a result of the determination by the determining means wherein said monitoring means is operable to: when no mobile communication devices are determined to be connected via the first communication cell and no mobile communication devices are determined to be connected via the second communication cell, stop downlink transmission in the first communication cell and the second communication cell prior to monitoring for further communication cells; and when at least one mobile communication device is determined to be connected via the first communication cell and no mobile communication devices are determined to be connected via the second communication cell, stop downlink transmission in the second communication cell but not the second communication cell prior to monitoring for further communication cells.

According to one aspect of the present invention, there is provided a mobile communication device operable to connect to a communication cell provided by communication apparatus comprising: means for providing a first communication cell via which a mobile communication device can connect to a communication network; means for providing a second communication cell via which a mobile communication device can connect to a communication network; and means for monitoring for further communication cells operating using any of a first set of radio access technology/frequency band combinations wherein said monitoring means is operable to: monitor a first subset of said first set of radio access technology/frequency band combinations using said means for providing a first communication cell; and monitor a second subset of said first set of radio access technology/frequency band combinations using said means for providing a second communication cell.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Although for efficiency of understanding for those of skill in the art, the invention will be described in detail in the context of a 3G system (UMTS, LTE), the principles of the invention can be applied to other systems (such as GSM, CDMA200, WiMAX) in which mobile devices or User Equipment (UE) communicate with one of several base stations with the corresponding elements of the system changed as required.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which.

DETAILED DESCRIPTION OF EXEMPLARY EMBODIMENTS

Overview

Figure 1:
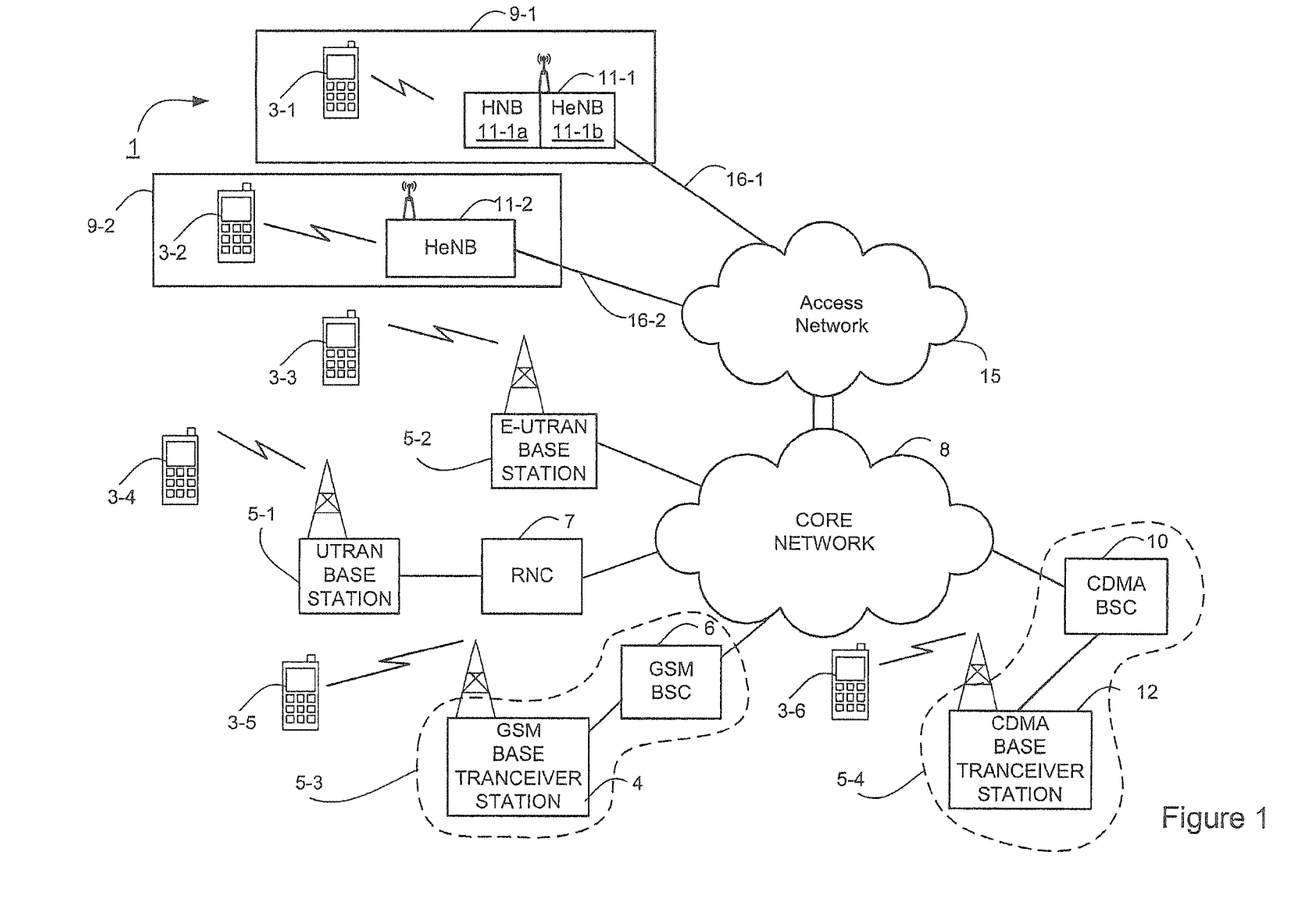
FIG. 1 schematically illustrates a mobile (cellular) telecommunication system.

FIG. 1 schematically illustrates a mobile (cellular) telecommunication system 1 in which users of mobile telephones (mobile communication devices) 3-1 to 3-6 can communicate with other users via different access nodes operating using different radio access technologies (RATs). In particular, mobile telephones 3 (or other user equipment) can make connections with the mobile telephone core network 8 directly via: a '3G' UMTS (Universal Mobile Telecommunications System) Terrestrial Radio Access Network (UTRAN) base station 5-1 and an associated Radio Network Controller (RNC) 7; an evolved UTRAN (E-UTRAN) base station 5-2; a '2G' Global System for Mobile Communications (GSM) base station 5-3 comprising a GSM base transceiver station (BTS) 4 and a GSM base station controller (BSC) 6; and/or a '2G' Code Division Multiple Access (CDMA) base station 5-4 comprising a CDMA base transceiver station (BTS) 12 and a CDMA base station controller (BSC) 10.

Mobile telephones 3 can also connect to the mobile telephone core network 8 using access points 11-2 and 11-1, commonly known as 'femto' access points (FAPs), provided in a user's commercial or private residence 9. In FIG. 1 the FAPs comprise a single mode FAP 11-2 and a dual mode FAP 11-1. In this embodiment, the single mode FAP 11-2 provides a single long term evolution (LTE)/E-UTRAN supporting femtocell. The dual mode FAP 11-1 effectively provides a dual femtocell that supports both LTE/E-UTRAN and UTRAN.

The single mode FAP 11-2 comprises an E-UTRAN supporting 'home' base station (HeNB) whilst the dual mode FAP 11-1 comprises an E-UTRAN supporting 'home' base station (HeNB) function 11-1*b* and a UTRAN supporting 'home' base station (HNB) function 11-1*a*.

The FAPs 11 are each coupled via a suitable Internet connection such as the ADSL or cable connection 16 and by an access network 15, which in this exemplary embodiment comprises a broadband access network (conforming to the BroadBand Forum, BBF), to the mobile telephone core telephone network 8. In the example illustrated in FIG. 1, mobile telephone 3-2 is connected to the core network 8 via the single mode FAP (HeNB) 11-2; the mobile telephone 3-1 is connected to the core network 8 via the dual mode FAP (HeNB/HNB) 11-1; mobile telephone 3-3 is connected to the core network 8 via E-UTRAN base station 5-2; mobile telephone 3-4 is connected to the core network 8 via UTRAN base station 5-1; mobile telephone 3-5 is connected to the core network 8 via GSM base station 5-3; and mobile telephone 3-6 is connected to the core network 8 via CDMA base station 5-4.

Each FAP 11 is operable in a network monitor mode (NMM) in which the FAP 11 can detect signals transmitted by other, neighbouring, access points, to capture the identities of the neighbouring access points and to populate a neighbour table with details of the neighbouring cells that can be used, for example, to support handover of a mobile communication device 3 between cells. The NMM is initiated during a self configuration process when the FAP 11 is first set up and periodically thereafter in order to maintain an accurate and up-to-date neighbour table. The NMM scanning is performed via the home base station function(s) of the FAP 11 of the FAP 11 performing the NMM process.

During the NMM, the FAP reads the system information blocks (SIBS) of the neighbouring cells to obtain information such as closed subscriber group identities (CSG IDs), Location Area Code (LAC), Routing Area Code (RAC), and Tracking Area Code (TAC). Measurements of conditions in the neighbouring cells are also made including, for example, measurements of Reference Signal Received Power (RSRP), received signal strength indicator (RSSI), and/or the like.

The neighbour table is thus populated with appropriate information such as Physical cell Identity (PCI) or Primary Scrambling Code (PSC), routing parameters (i.e. parameters which identity how to send any handover message to that particular cell), CSG Id (if applicable), LAC/RAC/TAC etc.

As will be described in more detail below, the single mode FAP 11-2 terminates its downlink (DL) transmissions before initiating the NMM and scanning for any potential neighbouring cells. Accordingly, when there are active (connected mode) mobile communication devices 3 in the cell of the single mode FAP 11-2, the single mode FAP 11-2 has to wait for the associated connections to be terminated before it can terminate the downlink transmissions and initiate the NMM.

The dual mode FAP 11-1 is advantageously operable in one of a plurality of NMMs—a first NMM (referred to herein as 'normal' or 'full' NMM), and a second NMM (referred to herein as a 'reduced' or 'partial' NMM). The dual mode FAP 11-1 is operable to initiate the 'normal' NMM when there are no active mobile communication devices 3 connected via either the HNB function 11-1a or the HeNB function 11-1b and to initiate 'partial' NMM when there are active mobile communication devices 3 connected via one of the home base station functions 11-1a, 11-1b but there are no active mobile communication devices 3 connected via the other of the home base station functions 11-1a, 11-1b.

In the normal NMM, the downlink transmissions of the HNB function 11-1a and the downlink transmissions for the HeNB function 11-1b are both terminated before normal NMM is initiated by the dual mode FAP 11-1. The dual mode FAP 11-1 then scans a 'full' set of potential RATs, and a 'full' set of the potential frequency bands, for any neighbouring cells. The 'full' set of RATs and 'full' set of frequency bands searched include the RAT and frequency band of the HNB function 11-1a and the RAT and frequency band of the HeNB function 11-1b.

In the partial NMM, before the partial NMM is initiated by the dual mode FAP 11-1, downlink transmissions are terminated for the home base station function 11-1a, 11-1b via which the active mobile communication devices 3 are connected. Downlink transmissions are not terminated, however, for the other of the home base station functions 11-1a, 11-1b (via which no active mobile communication devices 3 are connected).

On initiation of partial NMM, the dual mode FAP 11-1 scans a 'partial' set or 'subset' of RAT and frequency band combinations, for any neighbouring cells. The partial set of RAT and frequency band combinations searched include the RAT and frequency band combination of the home base station functions 11-1a, 11-1b for which the downlink transmission has been terminated but does not include the RAT and frequency band combination of the home base station functions 11-1a, 11-1b for which the downlink transmission has not been terminated.

The provision of a partial NMM can advantageously reduce the potential delay associated with waiting for both the HNB and HeNB functions 11-1a, 11-1b to cease serving any active mobile communication devices 3 in their respective effective cell of the dual femtocell provided by a dual mode FAP 11-1.

Where the dual mode FAP 11-1 has detected only a subset of neighbour cells using the partial NMM because one of the home base station functions 11-1a, 11-1b has connected mobile telephones 3, the dual mode FAP 11-1 can update the neighbour list with details of any other neighbouring cells that are not detected during the partial NMM in a subsequent partial NMM or normal NMM. Specifically, the dual mode FAP 11-1 can update the neighbour list in a subsequent partial NMM or normal NMM when the home base station functions 11-1a, 11-1b that was previously serving connected mobile telephones 3 no longer has any connected mode mobile telephones 3.

The dual mode FAP 11-1 is also beneficially able to limit the RAT/frequency combinations scanned such that a different respective 'partial' set of RAT/frequency band combinations may be scanned via each of the home base station functions even when normal NMM is performed. Specifically, this capability allows the dual mode FAP 11-1 to scan a subset of the 'full' set of RAT/frequency band combinations using the HNB function 11-1a and to scan a further subset of the 'full' set of RAT/frequency band combinations using the HeNB function 11-1b such that duplication of the RAT/frequency combinations scanned during a single NMM process is avoided (or is limited where there is a specific technical reason for duplication of scanning in one or more of the RAT/frequency combinations). This capability may also be beneficially used to avoid or limit duplication of the RAT/frequency combinations scanned during a partial NMM process carried out via the HNB function 11-1a and a partial NMM process subsequently carried out via the HeNB function 11-1b (or vice versa). This capability has benefits in terms of improved NMM efficiency and reduced energy consumption.

Exemplary Scenarios

Figure 2A:
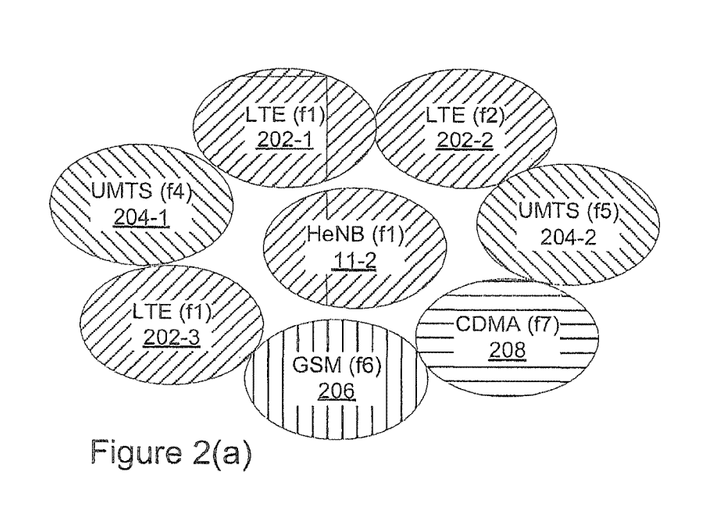
FIGS. 2(a) and 2(b) each illustrates an exemplary scenario in which a femto access point of the telecommunication system of FIG. 1 may operate.
Figure 2B:
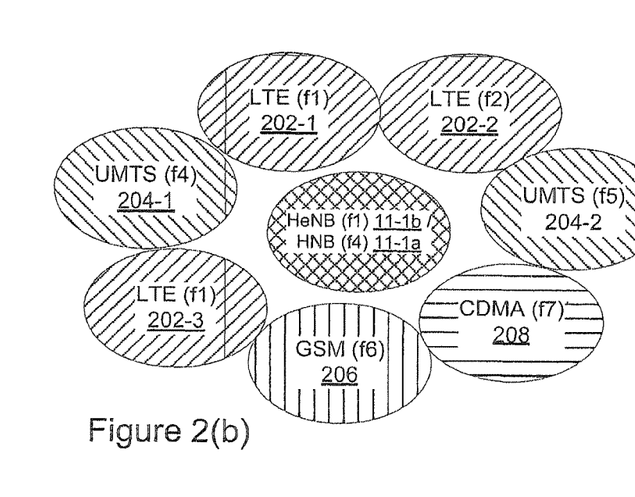

Operation of the single and dual mode FAPs 11 will now be described with reference to specific exemplary scenarios as illustrated in FIGS. 2(a) and 2(b).

FIG. 2(a) illustrates an exemplary scenario in which the femtocell provided by the single mode FAP 11-2 operates in frequency band 'f1' and has the following seven neighbour cells operating using various RATs:

Two LTE (E-UTRAN) RAT cells 202-1, 202-3 operating in frequency band 'f1'

One LTE (E-UTRAN) RAT cell 202-2 operating in frequency band 'f2'

One UMTS (UTRAN) RAT cell 204-1 operating in frequency band 'f4'

One UMTS (UTRAN) RAT cell 204-2 operating in frequency band 'f5'

One GSM RAT cell 206 operating in frequency band 'f6'

One CDMA RAT cell 208 operating in frequency band 'f7'

Before entering the NMM, the single mode FAP 11-2 first waits until any active (connected mode) mobile communication devices 3 that the FAP 11-2 is serving disconnect (e.g. entering an idle mode). When there are no connected mode mobile communication devices 3 in its cell, the HeNB of the single mode FAP 11-2 ceases downlink (DL) transmission and then, begins scanning for any potential neighbouring cells across a full range of radio access technologies (RATs) and frequency bands. Accordingly, while operating in the NMM, the single mode FAP 11-2 detects all seven neighbour cells.

FIG. 2(*b*) illustrates an exemplary scenario in which the dual mode FAP 11-1 comprises an HeNB function 11-1*b* that effectively operates an LTE/EUTRAN cell in frequency band 'f1' and an HNB function 11-1*a* that effectively operates a UMTS/UTRAN cell in frequency band 'f4' and has the same seven neighbour cells as the single mode FAP 11-2 of FIG. 2(*a*), namely:

Two LTE cells 202-1, 202-3 operating in frequency band 'f1'
One LTE cell 202-2 operating in frequency band 'f2'
One UMTS cell 204-1 operating in frequency band 'f4'
One UMTS cell 204-2 operating in frequency band 'f5'
One GSM cell 206 operating in frequency band 'f6'
One CDMA cell 208 operating in frequency band 'f7'

Before initiating the NMM, the dual mode FAP 11-1 determines whether there are any active (connected mode) mobile communication devices 3 operating in the dual femtocell and determines which of the two home base station functions (HNB and HeNB) 11-1*a*, 11-1*b* of the dual mode FAP 11-1 any active mobile communication devices 3 are connected via.

Active Mobile Communication Devices Connected Via Both HNB and HeNB:

When the dual mode FAP 11-1 determines that active mobile communication devices 3 are connected via both the HeNB and the HNB functions 11-1*a*, 11-1*b*, then the NMM is not initiated and the dual mode FAP 11-1 waits until the active (connected mode) mobile communication devices 3 connected via at least one of the HeNB and the HNB functions 11-1*a*, 11-1*b* disconnect before an NMM can be initiated.

Active Mobile Communication Devices Connected Via HeNB Only:

When the dual mode FAP 11-1 determines that active mobile communication devices 3 are connected via the HeNB function 11-1*b*, but that there are no active mobile communication devices 3 connected via the HNB function 11-1*a*, then a partial NMM is initiated. The dual mode FAP 11-1 terminates DL transmission of the HNB function 11-1*a* and scans for a subset of the possible RAT and frequency band combinations via the HNB function 11-1*a*. Specifically, the dual mode FAP 11-1 scans for cells of the RATs that do not correspond to the RAT of the home base station function (in this case the HeNB function 11-1*b*) via which active mobile communication devices 3 are connected. The dual mode FAP 11-1 also scans for cells operating in a different frequency band to the frequency band of the home base station function (in this case the HeNB function 11-1*b*) via which active mobile communication devices 3 are connected. The dual mode FAP 11-1 therefore only scans for cells in non-LTE (non-EUTRAN) RATs and for LTE (EUTRAN) RAT cells operating in a frequency band other than 'f1'.

Accordingly, in the example illustrated in FIG. 2(*b*), when the dual mode FAP 11-1 determines that active mobile communication devices 3 are connected via the HeNB function 11-1*b*, but that there are no active mobile communication devices 3 connected via the HNB function 11-1*a*, the dual mode FAP 11-1 initiates a partial NMM in which only a subset of the possible neighbour cells is detected comprising five neighbour cells, as listed below:

One LTE cell 202-2 operating in frequency band 'f2'
One UMTS cell 204-1 operating in frequency band 'f4'
One UMTS cell 204-2 operating in frequency band 'f5'
One GSM cell 206 operating in frequency band 'f6'
One CDMA cell 208 operating in frequency band 'f7'

Further, in the example illustrated in FIG. 2(*b*), in the partial NMM, when active mobile communication devices 3 are connected via the HeNB function 11-1*b*, but no active mobile communication devices 3 are connected via the HNB function 11-1*a*, the following cells are not detected:

Two LTE cells 202-1, 202-3 operating in frequency band 'f2'

Active Mobile Communication Devices Connected Via HNB Only:

When the dual mode FAP 11-1 determines that active mobile communication devices 3 are connected via the HNB function 11-1*a*, but that there are no active mobile communication devices 3 connected via the HeNB function 11-1*b*, then a partial NMM is initiated. The dual mode FAP 11-1 terminates DL transmission of the HeNB function 11-1*b* and scans for a subset of the possible RAT and frequency band combinations via the HeNB function 11-1*b*. Specifically, the dual mode FAP 11-1 scans for cells of the RATs that do not correspond to the RAT of the home base station function (in this case the HNB function 11-1*a*) via which active mobile communication devices 3 are connected. The dual mode FAP 11-1 also scans for cells operating in a different frequency band to the frequency band of the home base station function (in this case the HNB function 11-1*a*) via which no active mobile communication devices 3 are connected. The dual mode FAP 11-1 therefore only scans for cells in non-UMTS (non-UTRAN) RATs and for UMTS (UTRAN) RAT cells operating in a frequency band other than 14'.

Accordingly, in the example illustrated in FIG. 2(*b*), when the dual mode FAP 11-1 determines that active mobile communication devices 3 are connected via the HNB function 11-1*a*, but that there are no active mobile communication devices 3 connected via the HeNB function 11-1*b*, the dual mode FAP 11-1 initiates a partial NMM in which only a subset of the possible neighbour cells is detected comprising six neighbour cells, as listed below:

Two LTE cells 202-1, 202-3 operating in frequency band 'f1'
One LTE cell 202-2 operating in frequency band 'f2'
One UMTS cell 204-2 operating in frequency band 'f5'
One GSM cell 206 operating in frequency band 'f6'
One CDMA cell 208 operating in frequency band 'f7'

Further, in the example illustrated in FIG. 2(*b*), in the partial NMM, when active mobile communication devices 3 are connected via the HNB function 11-1*a*, but no active mobile communication devices 3 are connected via the HeNB function 11-1*b*, the following cells are not detected:

One UMTS cell 204-1 operating in frequency band 'f4'

No Active Mobile Communication Devices Connected Via Either the HNB or the HeNB:

When the dual mode FAP 11-1 determines that there are no active mobile communication devices 3 connected via the HNB function 11-1*a* or via the HeNB function 11-1*b*, then the normal NMM is initiated. The dual mode FAP 11-1 terminates DL transmission of the HeNB function 11-1*b* and the HNB function 11-1*a* and scans for the full set of possible RAT and a frequency band combinations. Accordingly, while operating in the normal NMM, the dual mode FAP 11-1 detects all seven neighbour cells.

Dual Mode Femto Access Point

Figure 3:
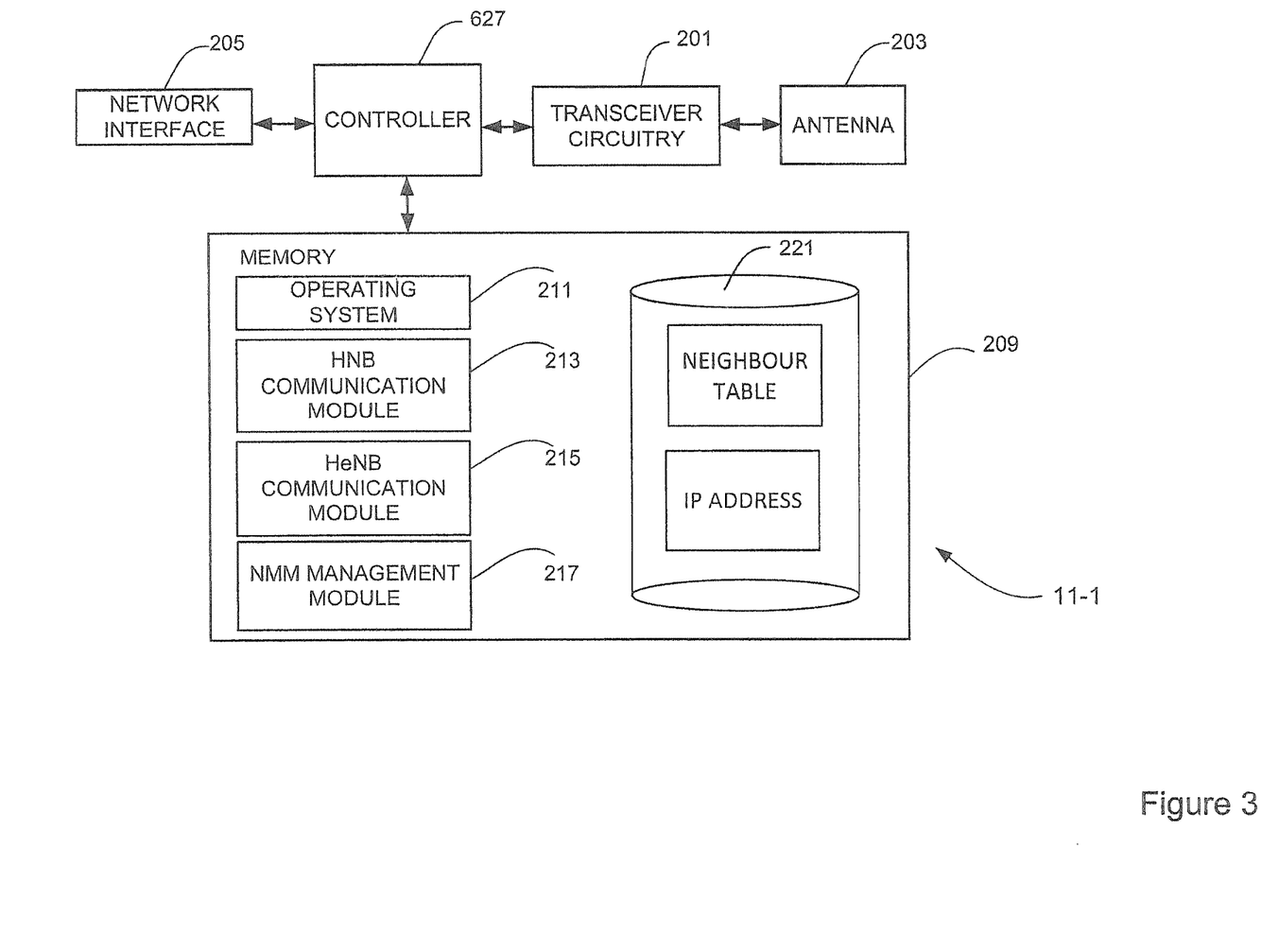
FIG. 3 is a block diagram illustrating the main components of the dual mode Femto Access Point (FAP) of the telecommunication system of FIG. 1.

FIG. 3 is a block diagram illustrating the main components of the dual mode Femto Access Point (FAP) 11-1 shown in FIG. 1. As shown, the dual mode FAP 11-1 includes transceiver circuitry 201 which is operable to transmit signals to, and to receive signals from, mobile telephones 3 or other user equipment via one or more antennae 203 and which is operable to transmit signals to and to receive signals from the core network 8 via a network interface 205. The operation of the transceiver circuitry 201 is controlled by a controller 207 in accordance with software stored in a memory 209. The software includes, among other things, an operating system 211, an HNB communication module 213, an HeNB communication module 215, and a Network Monitor Mode (NMM) management module 217. The memory 209 also holds a data store 221, where the HNB 11 stores, among other things, an IP address that is assigned to the FAP, and a neighbour table.

The HNB communication module 213 provides the communication functions of a UTRAN/UMTS home base station, thereby providing the HNB function 11-1a of the dual mode FAP 11-1. The HeNB communication module 215 provides the communication functions of an E-UTRAN/UMTS home base station, thereby providing the HeNB function 11-1b of the dual mode FAP 11-1. The NMM management module 217 identifies the occasions on which the NMM may be initiated, determines whether or not there are any active mode mobile communication devices 3 connected via the HNB and/or HeNB functions 11-1a, 11-1b, terminates downlink transmission if appropriate, enters normal NMM or partial NMM (when appropriate) in dependence on which of the HNB and/or HeNB functions 11-1a, 11-1b any active mobile communication devices 3 are connected via, and manages of performance of the NMM scanning process via one or both of the HNB and/or HeNB functions 11-1a, 11-1b.

The single mode FAP 11-2 shown in FIG. 1 will have similar components to those shown in FIG. 3. The main difference is that the single mode FAP only has a module for providing communication functions of a single home base station and not a plurality of home base stations—in this exemplary embodiment an HeNB.

Operation

Operation of the dual mode FAP 11-1 will now be described, by way of example only, with reference to FIGS. 4 and 5, each of which is a flow chart illustrating operation of the dual mode FAP 11-1 of FIG. 1.

Figure 4:
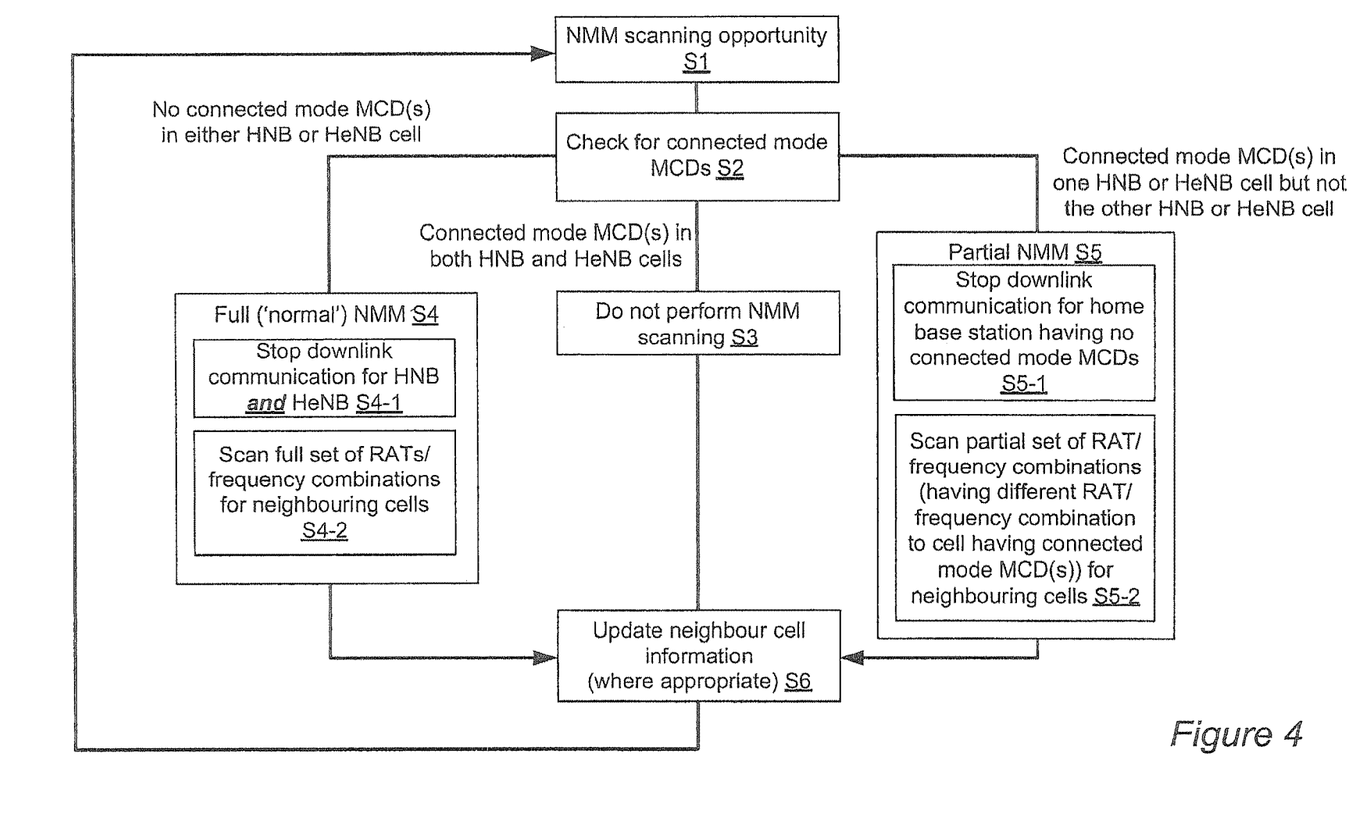
FIG. 4 is a flow chart illustrating operation of the dual mode FAP of FIG. 1.

As seen in FIG. 4, when the dual mode FAP 11-1 identifies an opportunity to initiate an NMM at S1, the dual mode FAP 11-1 checks to determine whether it is serving any connected mode mobile communication devices 3 at S2.

If the dual mode FAP 11-1 is not serving any connected mode mobile communication devices 3 then the dual mode FAP 11-1 initiates the normal NMM by stopping all downlink transmissions at S4-1 and then scanning a full set of RAT/frequency band combinations for neighbouring cells at S4-2.

If the dual mode FAP 11-1 determines that both its HNB and HeNB functions 11-1a and 11-1b are serving connected mode mobile communication devices 3, then the dual mode FAP 11-1 does not initiate any NMM at S3.

If the dual mode FAP 11-1 determines that only one of its HNB and HeNB functions 11-1a and 11-1b is serving active mobile communication devices 3 then the dual mode FAP 11-1 initiates the partial NMM by stopping, at S5-1, downlink transmissions for the HNB or HeNB function 11-1a, 11-1b that is not serving any active mobile communication devices 3 and maintaining downlink transmissions for the HNB or HeNB function 11-1a, 11-1b that is serving active mobile communication devices 3. The dual mode FAP 11-1 then scans a partial set/subset of RAT/frequency band combinations for neighbouring cells at S5-2. The partial set of RAT/frequency band combinations does not include the RAT/frequency band combination of the HNB or HeNB function 11-1a, 11-1b which is serving active mobile communication devices 3.

The dual mode FAP 11-1 then updates it neighbour table, if appropriate, at S6.

Figure 5:
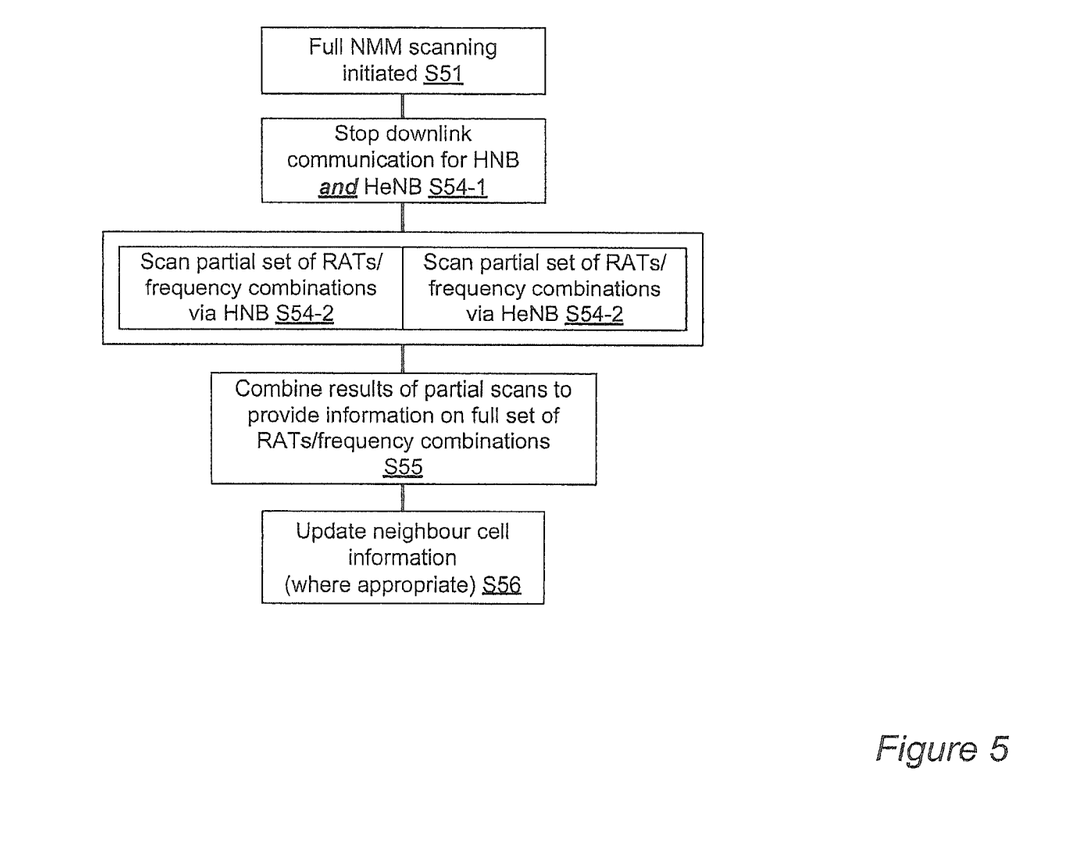
FIG. 5 is another flow chart illustrating operation of the dual mode FAP of FIG. 1.

FIG. 5 illustrates a particularly energy efficient normal or 'full' NMM process that can be employed by the dual mode FAP 11-1. As seen in FIG. 5, when the dual mode FAP 11-1 initiates NMM at S51, the dual mode FAP 11-1 scans a subset of the 'full' set of RAT/frequency band combinations for neighbour cells using the HNB function 11-1a at S54-1 and scans a further subset of the 'full' set of RAT/frequency band combinations for neighbour cells using the HeNB function 11-1b as S54-2. The results of these two partial NMM scanning processes are combined, at S55, to provide combined neighbour cell information for all of the RAT/frequency band combinations scanned by the HNB and the HeNB function 11-1a, 11-1b. The dual mode FAP 11-1 then updates it neighbour table, if appropriate, at S56.

Modifications and Alternatives

A detailed exemplary embodiment has been described above. As those skilled in the art will appreciate, a number of modifications and alternatives can be made to the above embodiment whilst still benefiting from the inventions embodied therein.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the exemplary embodiments described above, the FAPs each include transceiver circuitry. Typically this circuitry will be formed by dedicated hardware circuits. However, in some embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the FAPs as a signal over a computer network, or on a recording medium. Further, the functionality performed by part or all of this software may be performed using one or more dedicated hardware circuits. However, the use of software modules is preferred as it facilitates the updating of the base station and other functions of the FAPs.

It will be appreciated whilst the dual mode FAP 11-1 is described as effectively providing a dual femtocell that supports LTE/E-UTRAN and UTRAN the dual mode FAP 11-1 may also be thought of as providing two distinct single femtocells one of which supports LTE/E-UTRAN and the other of which supports UTRAN.

Whilst the FAPs 11 in the example of FIG. 1 are coupled directly to the broadband access network 15, the FAPs 11 may be coupled to the access network 15 via a residential gateway. The residential gateway may connect to the broadband access network 15 via a suitable Internet connection such as the ADSL or cable connection 16 and the H(e)NBs of the FAPs 11 may be programmed with the IP address of a security gateway (not shown) within the core network 8 so that, when powered up, the H(e)NBs initially connect to the pre-programmed security gateway.

In the above description, the dual mode FAP is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

For example, the NMM management module of the dual FAP may be implemented in an FAP architecture having a single integrated base band chipset for implementing the functions of both the HNB function and the HeNB function. In this case the NMM management module may be considered to comprise a single NMM module for managing the NMMs of both the HNB function and the HeNB function of the integrated chipset. Thus, where the NMM management module may be considered to comprise a single NMM module, the NMM management module will perform normal NMM, partial NMM or no NMM, as described above, in dependence on whether the dual mode FAP is serving any active mobile communication devices and via which home base station function any active mobile communication devices are connected.

The NMM management module of the dual FAP may be implemented in an FAP architecture having separate base band chipsets for respectively providing the HNB function and the HeNB function. In this case the NMM management module may be considered to comprise an NMM controller module and two separate NMM modules—one associated with the HNB function and one associated with the NMM of the HeNB function. Thus, where the NMM management module may be considered to comprise a plurality of NMM module, each NMM module may independently determine whether the respective home base station function that it is associated with is serving any active mobile communication devices or not. If the NMM module associated with the HNB function determines that the HNB function is not serving any mobile communication devices, then it independently stops its downlink transmissions and initiates a partial NMM in which only a partial set of RATs (excluding LTE/E-UTRAN RATs) is scanned for neighbour cells (otherwise no NMM is performed for the HNB). If the NMM module associated with the HeNB function determines that the HeNB function is not serving any mobile communication devices, then it, independently stops its downlink transmissions and initiates a partial NMM in which only a partial set of RATs (excluding UMTS/UTRAN RATs) is scanned for neighbour cells (otherwise no NMM is performed for the HeNB). The NMM controller module combines any results of partial NMMs initiated by the two separate NMM modules to determine a full list of neighbour cells where no active mobile communication devices are being served or a partial list of neighbour cells where active mobile communication devices are being served by one of the home base station functions.

Although for efficiency of understanding for those of skilled in the art, the invention has been described in detail in the context of a dual FAP comprising the functionality of two home base stations (HNB and HeNB), the principles of the invention can be applied to a multimode FAP comprising the functionality of more than two home base stations with the corresponding elements of the system changed as required.

Furthermore, although a dual mode FAP having an LTE radio access technology based home base station (HeNB) function and a UMTS radio access technology based home base station (HNB) function the FAP may, alternatively or additionally, have home base station functions that operate using any suitable radio access technology and/or frequency band. For example, a multimode FAP (such as a dual mode FAP) may have a plurality of home base station functions that each operates using the same radio access technology but different frequency bands.

It will be appreciated that the term radio access technology (RAT) is a term of art that will be readily understood by those skilled in the art to refer collectively to the various communication methods, communication protocols, signal encoding/decoding, and/or the like techniques required to connect to a communication cell via a particular communication cell that operates using that radio access technology. As described above, cells operating using the same RAT may nevertheless operate using different frequency bands.

Various other modifications will be apparent to those skilled in the art and will not be described in further detail here.

This application is based upon and claims the benefit of priority from United Kingdom patent application No. 1120717.2, filed on Dec. 1, 2011, the disclosure of which is incorporated herein in its entirety by reference.

What is claimed is:

1. A base station of a communications network, the base station comprising:
   a transceiver circuit configured to transmit signals in a first cell and signals in a second cell; and
   a controller configured to:
      determine if signals in the second cell should be stopped based on a load of the first cell; and
      update information of a neighbor cell when the signals in the second cell is stopped, and
   wherein the information of the neighbor cell includes at least one of frequency and tracking area code used in the neighbor cell.

2. The base station of claim 1, wherein the controller is further configured to stop signals in the second cell.

3. The base station of claim 1, wherein the first cell includes a 3G cell and the second cell includes a Long Term Evolution (LTE) cell.

4. The base station of claim 1, wherein the first cell includes a Long Term Evolution (LTE) cell and the second cell includes a 3G cell.

5. A communications method in a base station of a communications network, the communications method comprising:
   transmitting, by the base station, signals in a first cell and signals in a second cell; and
   determining, by the base station, if signals in the second should be stopped based on a bad of the first cell;
   updating, by the base station, information of a neighbor cell when the signals in the second cell is stopped,
   wherein the information of the neighbor cell includes at least one of frequency and tracking area code used in the neighbor cell.

6. The communications method of claim 5, wherein the method further comprises stopping, by the base station, signals in the second cell.

7. The communications method of claim 5, wherein the first cell includes a 3G cell and the second cell includes a Long Term Evolution (LTE) cell.

8. The communications method of claim 5, wherein the first cell includes a Long Term Evolution (LTE) cell and the second cell includes a 3G cell.

\* \* \* \* \*

UNITED STATES PATENT AND TRADEMARK OFFICE
CERTIFICATE OF CORRECTION

PATENT NO. : 9,706,389 B2
APPLICATION NO. : 15/066971
DATED : July 11, 2017
INVENTOR(S) : Suresh Ganapathy et al.

It is certified that error appears in the above-identified patent and that said Letters Patent is hereby corrected as shown below:

On the Title Page

Column 1, Line 1 (71) Applicant:
Before "Tokyo", insert --Minato-ku,--

In the Specification

Column 11, Line 11:
"(SIBS)" has been replaced with --(SIBs)--

Column 13, Line 2:
"then," has been replaced with --then--

Column 14, Line 12:
"'f2'" has been replaced with --'f1'--

Column 14, Line 35:
"'14'." Has been replaced with --'f4'.--

In the Claims

Claim 5, Column 18, Line 56:
"bad" has been replaced with --load--

Signed and Sealed this
Twenty-second Day of May, 2018

Andrei Iancu
*Director of the United States Patent and Trademark Office*